Aug. 7, 1928.
S. F. WALDEN
1,679,642
CANOPY FOR TRUCKS
Filed Dec. 14, 1923
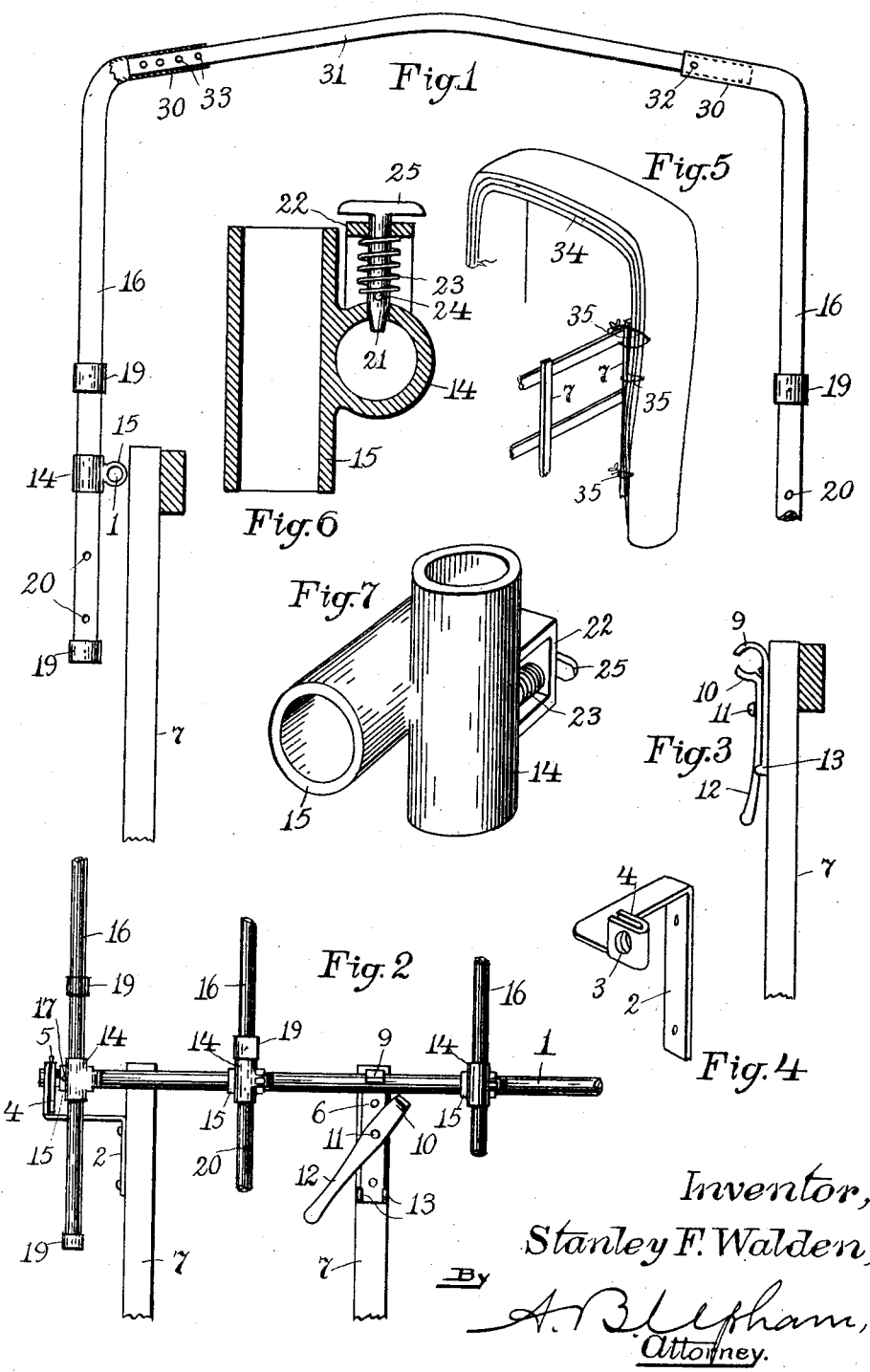
Inventor,
Stanley F. Walden;
By
Attorney.

Patented Aug. 7, 1928.

1,679,642

UNITED STATES PATENT OFFICE.

STANLEY F. WALDEN, OF NEWTON, MASSACHUSETTS.

CANOPY FOR TRUCKS.

Application filed December 14, 1923. Serial No. 680,617.

The object of this invention is the construction of a canopy top which can be adjusted for all ordinary sizes of trucks; which can be raised and lowered to various heights; which can be shifted longitudinally upon the truck to extend its entire length or to be housed at the forward end of the truck body, and, when thus housed, the forward breadth can be disposed to protect the remainder of the canopy from rain and snow. A further object is the construction of a releasable intermediate support for the side rods of the canopy frame, and the effecting of other improvements in details of construction.

In the drawings forming part of this specification, Fig. 1 is an elevation of one of the frame elements, parts thereof being in section and broken away. Fig. 2 is a side elevation of a portion of the canopy frame. Fig. 3 is an elevation of one of the intermediate rod-supports. Fig. 4 is a perspective view of one of the end-supports for the side rods. Fig. 5 is a perspective view on a small scale illustrating the canopy in its housed position. Fig. 6 is a sectional plan view of one of the socket members for the frame elements. Fig. 7 is a perspective view of the same.

The canopy frame comprises at each side of the truck-body, a side bar 1 preferably composed of tubing, terminally supported at the ends by brackets 2 which are attached to the stakes at the front and rear of the truck. Each bracket 2 is offset to present the side bars 1 out of contact with the stakes, and its outer end is doubled on itself and apertured, as at 3, to receive an end of a side bar. Through the space between the doubled end 4 and the remainder of the bracket a pin or bolt is thrust, as 5, also passing through the side bar, for retaining the latter in place. I prefer to have such space so narrow as to tightly grip the pin or bolt and thereby to ensure against the latter's being jarred out therefrom.

At an intermediate point each side bar 1 is supported by a releasable bracket 6 attached to a stake 7 thereat, the bracket having a hook 9 at its upper end embracing the top surface of the bar, and a lock 10 which is pivoted to it at 11. When this lock is swung to a vertical position it presses the bar 1 snugly into engagement with the hook 9, this position of the lock being ensured both by the counter-weight of its tail 12, and by the lugs 13 between which the tail rests.

Slidable along the side bars 1 are socket members comprising two cylindrical sockets 14 and 15, as shown in Figs. 6 and 7, the socket 15 being the one penetrated by the side rods, and the socket 14 being for the uprights 16 of the canopy hoops. The socket members at the front end of the truck body are designed to be permanently fastened thereat, but the rear socket members are releasably secured in position, as by pins 17, while the remainder of the socket members are not confined in place by other means than the canopy fabric.

The hoop uprights 16 are slidable in the sockets 14 and are prevented from pulling entirely out and from descending too far by shoulders 19. Intermediate of these positions, the uprights are retained in several different positions by holes 20 in the uprights and pins 21 in the sockets 14. No such hole is provided near the upper collar 19 so that, when the hoops are being supported by these collars resting on the ends of the sockets 14, the uprights can permit a limited rotation therein. This is for the purpose of permitting the hoops and the fabric attached thereto unhindered movement along the side bars 1. In either housing the canopy or drawing it out into service, it is impossible to slide both uprights of a hoop equally, and, if such rotation were not permitted, the socket members would cramp and bind on the side bars and render the task very difficult.

As illustrated in Fig. 6, each pin 21 passes through a shelf 22 and the wall of the socket 14 into a hole 20 in an upright, being yieldingly pressed therein by a helical spring 23 located between a pin 24 and the shelf 22. The outer end of each pin is provided with a head or thumb piece 25 reaching beyond the edges of the shelf 22 for the purpose of facilitating its manipulation.

To render the canopy frame adaptable to several different widths of trucks, I provide each upright 16, which is itself preferably tubular, with a tubular elbow 30 which is canted slightly upward, as shown in Fig. 1. Into these elbows are thrust the ends of the slightly arched hoop 31, which are retained therein by a pin 32 passing through holes 33 in the elbows and hoop terminals at points which fit the truck upon which the canopy is being mounted.

When the canopy is housed, all the canvas 34 composing the top and sides, and all the hoops supporting the same are pressed together and beneath the foremost breadth of the canvas, means being provided, as ropes or straps 35 for fastening this breadth to the stakes thereat, and thereby shielding against rain and snow the remainder of the canopy.

What I claim as my invention is:

1. A canopy frame for trucks comprising side bars supported by the truck body, socket members each having two sockets at right angles to each other but not in the same plane, one socket of each member being slidable upon a side bar, uprights slidable in the vertical sockets of the said members, and a spring-pressed pin carried by each vertical socket, each vertical socket having integral therewith a U-shaped portion forming a shelf pierced by said pin, each pin having a head larger than and exterior to the associated shelf and carrying a helical spring mounted thereon between the shelf and socket so as to press against another pin carried on said spring-pressed pin, and the uprights having holes for receiving the ends of the spring-pressed pin.

2. A canopy frame for trucks comprising side bars supported by the truck body, socket members each having two sockets at right angles to each other but not in the same plane, one socket of each member being slidable on a side bar, uprights slidable in the vertical sockets of said member, and a spring-pressed pin carried by each vertical socket, the latter having a shelf partially supporting said pin, and the pin having a head projecting beyond the edges of said shelf, said uprights having holes for receiving said pin.

3. A canopy frame having a side bar terminally supported by the truck body, uprights slidably supported on said side bar, and an intermediate support for the side bar comprising a hooked member attached to a stake of the truck body with the hook close to the upper end of the stake and adapted to reach over the side bar, and a lock pivoted thereto to swing up beneath the side bar and hold it in said hook, said lock having a weighted tail for retaining it in place, and said intermediate support having lugs for engaging said tail and further ensuring its retention.

4. A canopy frame having a side bar and terminal supports therefor comprising in each case an offset member attached to a stake of the truck body, the outer end of said member being doubled on itself and apertured for the reception of an end of said bar, and having a pin passed through it gripped in the space between the doubled parts.

In testimony that I claim the foregoing invention, I have hereunto set my hand this 12th day of December, 1923.

STANLEY F. WALDEN.